INVENTOR.
HANS BORNHAUSER
BY Edward S. Drake
AGENT

Oct. 27, 1964 H. BORNHAUSER 3,154,763

CORE STORAGE MATRIX

Filed July 10, 1957 2 Sheets-Sheet 2

United States Patent Office 3,154,763

Patented Oct. 27, 1964

3,154,763

CORE STORAGE MATRIX

Hans Bornhauser, Boblingen, Germany, assignor to International Business Machines Corporation, New York, N.Y., a corporation of New York Filed July 10, 1957, Ser. No. 671,016
17 Claims. (Cl. 340—174)

This invention relates to magnetic core storage systems and more particularly to such systems employing novel semiconductive switching arrangements.

In high speed electronic computers utility is frequently made of magnetic core matrix networks for storing information. Such networks use magnetic cores with rectangular or substantially rectangular hysteresis loops. The cores have vertical and horizontal conductors intersecting each of them in a bidirectional manner. Magnetization of any one of a plurality of cores in a core word requires the energization by a suitable current pulse, for example in the order of about 300 milliamperes, of the selected column and row core of the particular word. Such a storage system applies the current coincidence principle of operation, with positive and negative remanence levels of the hysteresis loop of a magnetic core being employed to store values. Once a particular core has been brought into a certain remanence state it retains that condition until the application of a pulse in the opposite direction.

It is customary to provide a plurality of drivers or complex switching techniques for accomplishing the energization of the cores in one of the two flux directions. A variety of arrangements of vacuum tube circuits have been used to switch and control the operation of core storage networks. However, transistor arrangements have numerous advantages over previous methods. Some transistor-type core networks switching arrangements are shown in copending application Serial No. 667,637, filed June 24, 1957 and now abandoned copending application Serial No. 667,625, filed June 24, 1957 now Patent No. 2,939,118.

According to the present invention two conventional drivers are provided to energize all columnar cores in the reading or writing direction, and any conventional source of data representing pulses serves to energize the row core. The coincident application of a write columnar pulse and a row pulse energize in the conventional manner only the selected ones of said cores in the writing direction. A different input semiconductive switch between the driver and each column of cores selects the particular column for a reading or writing operation. Similarly, a different output semiconductive switch associated with each word of cores determines whether reading or writing of that particular word is to be accomplished.

Thus the coincident operation of a pair of semiconductive switches speedily and efficiently determine word and column selection in a plural word magnetic core storage system. Symmetrical and unidirectional transistors are employed to accomplish the efficient switching operations. Symmetrical transistors are known in the art, and have been discussed, for example, in George Clifford Sziklai, "Symmetrical Properties of Transistors and Their Applications," Proceedings of the IRE vol. 41, No. 6 (June 1953), pages 717–724, and Arthur W. Lo et al., Transistor Electronics (Prentice Hall, Inc., 1955), pages 70–75.

Therefore the principal object of this invention is to provide a driver switching arrangement for a magnetic core matrix network in which a minimum number of drivers is required.

Another object is to provide a core matrix storage system in which a minimum number of semiconductive switches determine particular core selection for reading and writing in a plurality of wood cores.

Another object of this invention is to provide a magnetic core matrix switching arrangement in which coincident functioning transisitors serve as column and word selection devices.

Other objects of the invention will be pointed out in the following description and claims and illustrated in the accompanying drawings, which disclose, by way of examples, the principle of the invention and the best mode, which has been contemplated, of applying that principle.

As illustrated in the two figures, the cores in the plurality of words are arranged in a two-dimensional matrix system. Each word is composed of a number of columns of cores. For convenience, only three core words 1, 2 and N and four rows of cores per column of each word are illustrated. However, it is understood that the number of rows and columns is merely illustrative, and is not intended to indicate the capacity of the disclosed storage system. Similar numbered components in both figures identify identically functioning components.

Figure 1:
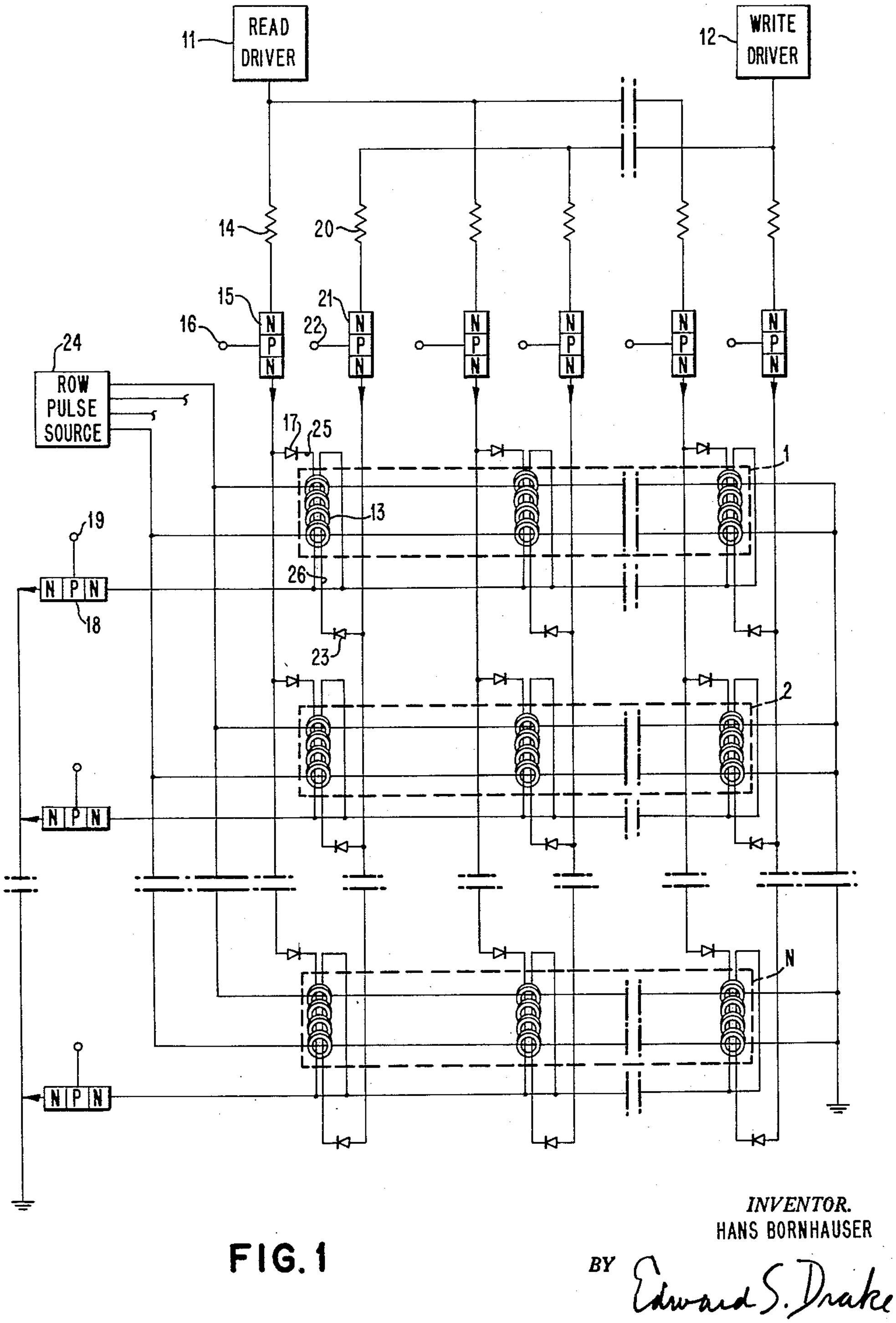
FIG. 1 illustrates one embodiment of the invention employing non-symmetrical transistors.

The embodiment of FIG. 1 illustrates a plural word magnetic storage system employing a conventional read driver 11 and a conventional write driver 12 for pulsing all columns of cores 13 in the three core words illustrated in broken lines. In the case of the write section parallel arranged resistors 20 are connected from the output of write driver 12 to corresponding NPN junction transistors 21. The three-element transistor 21 serves as an input switch. For example, assuming that a negative driver pulse is applied at its emitter element and a suitable positive pulse at its input terminal 22, connected to the base element, a current of predetermined magnitude is developed at the collector element. The collector element may be connected to one of a plurality of parallel arranged diodes 23. The latter pass the current pulses developed by transistor 21 unidirectionally through a core winding 26. It is clear that each of the columns of cores of the word 1, for example, that is pulsed by a different diode 23 is determined by the ON or OFF condition of input switch 21. The row of each word in which the information is to be stored in accordance with the current coincidence principle of recording is determined by a conventional data representing pulse source 24. Two of its output lines are shown connected to a first and fourth row of cores in words 1, 2 and N. Storage in the cores is accomplished by the simultaneous application of current pulses by the write driver 12 and row pulse source 24. The appropriate column switching transistor 21 and word switching transistor 18 must also be ON at this time.

The core windings 26 of all the columns in each word are connected to an element of output transistor 18. This transistor functions as a switch to be turned ON or OFF under the control of an appropriate control bias provided at input terminal 19, which is connected to the base element of the transistor. In this way a complete current path will be formed from write driver 12 to ground. Whether reading is to be accomplished from word 1, 2 or N will be determined entirely by the operation of one of the plurality of parallel connected output switches 18.

The arrangement of the read section of the storage system of FIG. 1 is identical to that for the above-mentioned write portion. A plurality of parallel arranged resistors 14 connects a conventional driver 11 to an input transistor 15. Control bias suitably applied at input terminal 16 determines the ON or OFF condition of said transistor to gate the current pulses provided by driver 11 to one of a plurality of corresponding columns in a number of words for reading information previously stored therein. The plurality of parallel connected diodes 17 permit unidirectional current flow in core windings 25 in a direction opposite to that described above in the case of the writing operation. It will be noted that the pulses developed by the read and write drivers are of the same polarity, and the opposite flux conditions developed in the core result from the different core winding directions.

As in the write condition, the operation of the output transistor 18 by a suitable bias supplied at its input terminal 19 selects the core word from which the reading is to take place. Thus the plurality of current pulses developed by read driver 11 are selectively made available by the input switches 15 to one of the many columns of cores 13 in the overall storage system, with output switch 18 selecting the word from which this reading is to take place.

Figure 2:
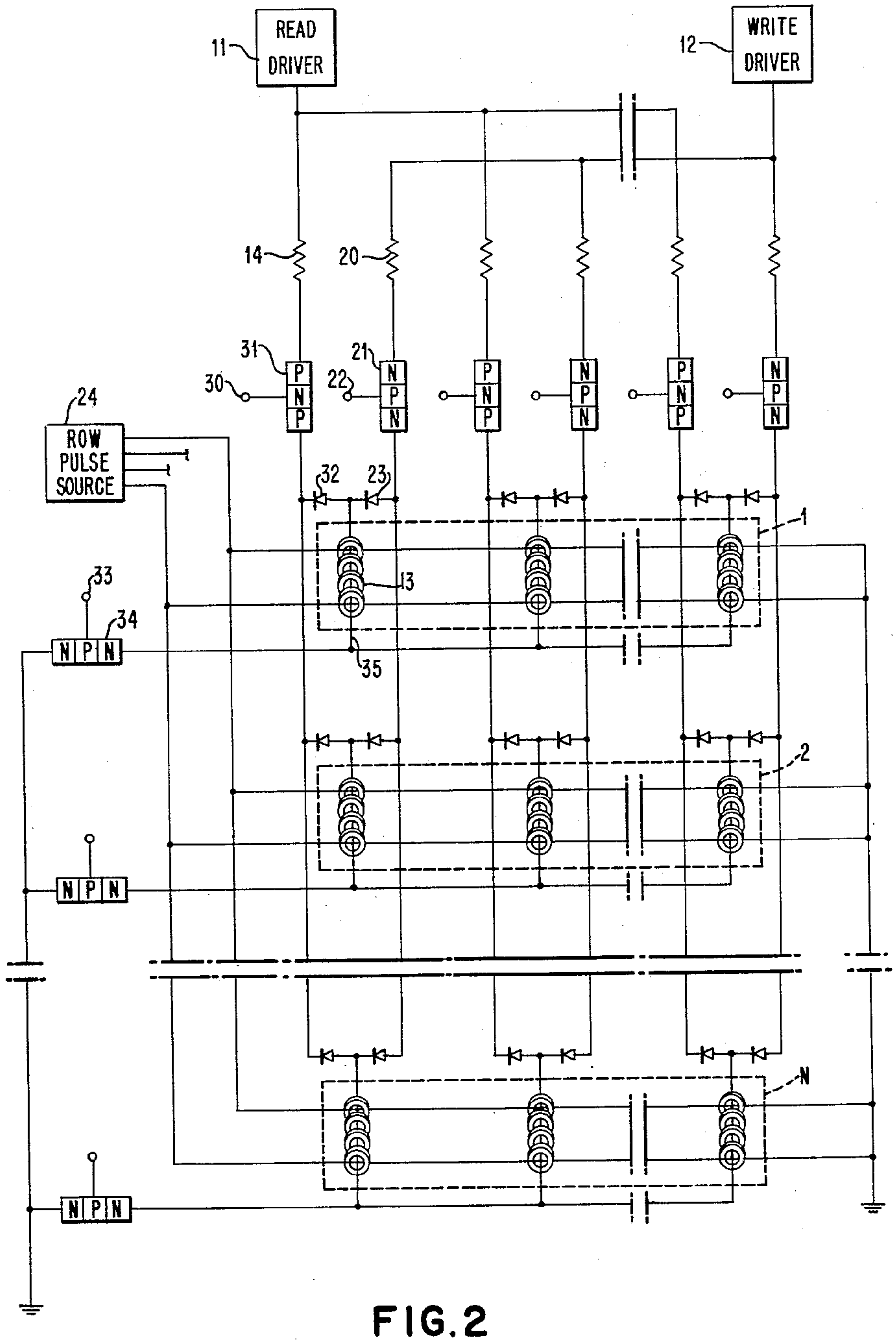
FIG. 2 is another embodiment of the invention employing both symmetrical and non-symmetrical transistors.

FIG. 2 illustrates an embodiment of the invention in which the input column selecting switch in the reading and writing section is unidirectional in character and the output switch for controlling word selection is symmetrical. The symmetrical NPN transistor 34 shown in FIG. 2 is capable of operating in the first and third quadrants, permitting current to flow therefore in the both directions. In the first quadrant a small negative blocking voltage at the base suffices to place the transistor in the OFF condition. However, to develop an OFF condition in the third quadrant, the negative blocking voltage at the base must be greater than the applied collector voltage. When the collector voltage becomes more negative than the base voltage, the base-collector portion of the transistor is controlled in the forward direction. If the collector voltage becomes more positive than the base voltage, the base-collector portion of the transistor is controlled in the reverse direction.

Thus the element of transistor 34 that is connected directly to the parallel arranged columnar windings of each word may serve as an emitter or a collector element, as the case may be, the operation of said transistor being controlled by the current pulse made available at input terminal 33 from a suitable voltage source. Input terminal 33 is connected to the base element of transistor 34. The symmetrical output transistor 34 permits a single core winding to be used instead of a double winding as in the embodiment of FIG. 1. However, the read and write drivers now provide pulses of different polarity for accomplishing the transfer of the cores from one remanence state to another.

The write section of the FIG. 2 circuit is identical to that of FIG. 1 with the input NPN transistor switch 21 operating diode 23 in a manner to cause the current to flow in one direction through windings 35. In this case input terminal 33 of symmetrical transistor 34 applies a bias to the base of said transistor of a character to allow current flow in the direction of ground.

However, in the case of the read section, read driver 11 provides an opposite or positive pulse to a PNP transistor 31, which under the control of an appropriate bias at input terminal 30, connected to the base of said transistor, permits current to flow through winding 35 and diode 32 in a direction opposite from that in writing. This means that the control bias applied at input terminal 33 of the symmetrical transistor 34 is of a character to allow current flow in said output transistor 34 in the direction from ground. As in the FIG. 1 embodiment, the conventional row pulse source 24 selects the row for energization. A separate source could be provided for each word if desired rather than as shown.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A memory comprising a plurality of word groups of magnetic cores arranged in columns and rows, said cores being capable of adopting two stable remanence states in response to coincident currents, winding means for said rows of cores, said row winding means for corresponding rows of all said word groups being connected in parallel, winding means for said columns of cores, said column winding means for all said columns being connected in parallel, said row winding means and said column winding means being energizable for placing selected cores in said remanence states, source means for providing data representing pulses to said row winding means, driving means for providing column pulses to said column winding means, transistor means in each of said column winding means for gating said column pulses selectively to said column winding means, and a plurality of other transistor means each one common connected to all said column winding means of an associated word group for gating said column pulses selectively through said column windings of said words.

2. A memory comprising a plurality of word groups of cores arranged in columns and rows in which said cores are capable of assuming two remanence states in response to coincident currents, column drive means and row drive means for providing current pulses, a plurality of impedance elements, one for each said column, connected in parallel to said column drive means, a plurality of input transistor switches, each said switch being connected to a different said impedance element for gating said column current pulses, a plurality of winding means, one corresponding to each column of each said word group, a plurality of diodes, one connected to each of last said winding means, means common connecting each said input transistor switch to one end of each said winding means in corresponding said columns, and a plurality of output transistor switches, each said output switch corresponding to a word group and being common connected to all column windings of said corresponding word group for selecting the particular word group that is to be operated by said column and row current pulses.

3. A memory in which a plurality of cores are arranged in word groups of columns and rows, column and row windings passing through said cores, each said core being capable of assuming two stable remanence states in response to coincidence of current in associated row and column windings driving means for energizing said row windings, read driving means and write driving means for providing drive pulses for all said column windings, input transistor means for gating said drive pulses to said column windings for selecting the particular column for reading or writing, and output transistor means connected to said column winding means for selecting the particular word that is to be operated for reading or writing, said input and output transistor means being operative coincidentally.

4. A magnetic core memory comprising a plurality of magnetic core matrix arrangements forming word groups of columns and rows with column and row windings, each of said cores being capable of assuming two stable remanence states in response to coincidence of currents in associated said column and row windings, read drive means, write drive means, an individual winding for each column of each said word group, a plurality of first type of input transistor switches operated by said read drive means, each of said switches being connected to all said individual windings of corresponding columns of said word groups, a plurality of second type of input transistors switches operated by said write drive means, each of said second type switches being paired with a said first type input transistor switch and connected to all said individual windings of corresponding columns of said word groups, oppositely arranged unilateral conductive means connected with said pairs of said input transistor switches for passing current in said individual winding means in opposite directions for reading and writing, a plurality of symmetrical output transistor switches, one corresponding to each word group and connected to all said individual windings of said corresponding word group for selecting the particular word group for operation, means for providing row pulses, and means connecting the row windings of all said word groups in parallel to said row pulse providing means for the selection of word cores in accordance with the coincident operation of selected ones of said input transistor switches and selected ones of said output transistor switches.

5. A memory in which a plurality of cores are arranged in word groups of columns and rows, each word group consisting of plural rows of said cores, and each of said cores being capable of assuming two stable remanence states in response to coincident currents in associated row and column windings, write drive means and read drive means for said columns of cores, a pair of input transistors corresponding to each said column and operable for selecting the corresponding columns of all said word groups for pulsing by said read drive means and write drive means, a column winding for each column of each word group the pulsing of which is controlled by one transistor of each said pair for reading and by the other transistor of the pair for writing, a source of row pulses, an individual row winding for each said row of cores, corresponding said row windings in all word groups being parallel connected to said source of row pulses, and a plurality of parallel connected symmetrical output transistors corresponding to said word groups, each of said output transistors being connected to all said column windings of a corresponding said word group for selecting the particular word group in which the information is to be written or read by providing a complete current path for energizing the cores in the selected column of a selected word group.

6. The invention according to claim 3 in which the input and output transistor means are NPN junction transistors.

7. The invention according to claim 4 wherein the plurality of input transistor switches operated by the read drive means are of the PNP junction type, the plurality of input transistor switches operated by the write drive means are of the NPN junction type, and the word selection transistor switches are of the NPN junction type.

8. A memory in which a plurality of cores are arranged in word groups of columns and rows, column and row winding means passing through said cores, each said core being capable of assuming two stable remanence states in response to the coincidence of current in associated row and column windings, row driving means for providing drive pulses for said row winding means, column driving means for providing drive pulses for all said column winding means, input gating means for gating said drive pulses to said column windings for selecting a particular column, and output gating means connected to said column winding means for selecting a particular word, said input and output gating means being operative coincidently.

9. The invention of claim 8 wherein said column driving means comprise read driving means and write driving means.

10. The invention of claim 8 wherein said input gating means are transistor gating means.

11. The invention of claim 8 wherein said output gating means are transistor gating means.

12. The invention of claim 8 wherein said input gating means and said output gating means are transistor gating means.

13. The invention of claim 9 wherein said input transistor means comprise a pair of unidirectional transistors for each said column and said output transistor means comprise a symmetrical transistor for each word group of columns gating in one direction during a read mode and in the opposite direction during a write mode.

14. The invention of claim 13 wherein said pair of transistors for each column comprises one which is the NPN type and the other which is the PNP type.

15. The invention of claim 14 wherein each said bidirectional gating means is an NPN type transistor.

16. The invention of claim 9 wherein said column winding means comprise a single column winding for each column of each word group, said column winding being selectively driven by said read driving means and said write driving means.

17. The invention of claim 9 wherein said column winding means comprise a pair of column windings for each column of each word group, one winding of each pair being driven selectively by said write driving means and the other selectively by said read driving means.

References Cited in the file of this patent

UNITED STATES PATENTS

| | | |
|---|---|---|
| 2,691,155 | Rosenberg et al. | Oct. 5, 1954 |
| 2,760,088 | Pittman et al. | Aug. 21, 1956 |
| 2,939,119 | Eiensele | May 31, 1960 |
| 3,054,092 | Breitling | Sept. 11, 1962 |

FOREIGN PATENTS

| | | |
|---|---|---|
| 1,186,856 | France | Sept. 3, 1959 |

UNITED STATES PATENT OFFICE

CERTIFICATE OF CORRECTION

Patent No. 3,154,763 October 27, 1964

Hans Bornhauser

It is hereby certified that error appears in the above numbered patent requiring correction and that the said Letters Patent should read as corrected below.

Column 1, line 40, for "2,939,118" read -- 2,939,119 --; column 2, line 2, for "wood" read -- word --.

Signed and sealed this 23rd day of November 1965.

(SEAL)
Attest:

ERNEST W. SWIDER
Attesting Officer

EDWARD J. BRENNER
Commissioner of Patents